No. 615,303. Patented Dec. 6, 1898.
J. G. PARSONS.
HORSESHOE.
(Application filed Jan. 19, 1898.)

(No Model.)

WITNESSES:
H. B. Bradshaw
A. L. Phelps

INVENTOR
John G. Parsons
BY
C. C. Shepherd,
ATTORNEY

UNITED STATES PATENT OFFICE.

JOHN G. PARSONS, OF COLUMBUS, OHIO.

HORSESHOE.

SPECIFICATION forming part of Letters Patent No. 615,303, dated December 6, 1898.

Application filed January 19, 1898. Serial No. 667,153. (No model.)

*To all whom it may concern:*

Be it known that I, JOHN G. PARSONS, a citizen of the United States, residing at Columbus, in the county of Franklin and State of Ohio, have invented a certain new and useful Improvement in Horseshoes, of which the following is a specification.

My invention relates to the improvement of horseshoes, and has relation not only to the form of the shoe, but to the construction and connection of calks therefor.

The objects of my invention are to provide an improved form of horseshoe which shall be light, strong, durable, and inexpensive, to combine with said horseshoe improved calks and means for connecting the same with the shoe, and to produce certain improvements in details of construction and arrangement of parts, which will be more fully pointed out hereinafter. These objects I accomplish in the manner illustrated in the accompanying drawings, in which—

Figure 1:
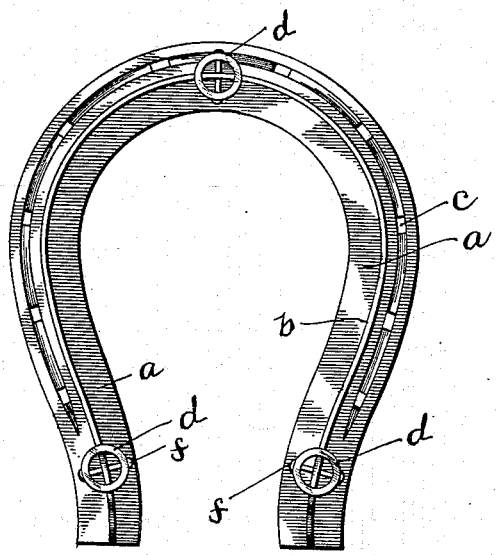
Figure 2:
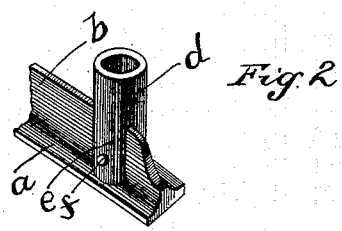
Figure 3:
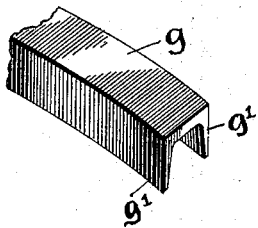
Figure 4:
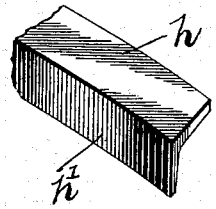

Figure 1 is an under side or face view of a shoe having my improved construction. Fig. 2 is a detail view in perspective of a portion of said shoe; and Figs. 3 and 4 represent, respectively, in perspective portions of shoes having a modified form.

Similar letters refer to similar parts throughout the several views.

In constructing my improved shoe I provide the body $a$ or that portion thereof which is secured against the hoof of the horse with a central downwardly-extending rib $b$ of suitable depth, said rib being preferably formed integral with said body and preferably extending throughout the length of and conforming to the curve of the latter. On the outer side of this rib I provide the body $a$ with a desirable number and arrangement of nail-holes $c$.

$d$ represents calks, the preferable form of which is shown in the drawings, in which the same are constructed in a tubular form. It is obvious, however, that calks of other forms in cross-section may be employed, if desired.

The upper end portion of each of the calks $d$ is provided with a vertical slit $e$, which is adapted to receive the rib $b$ of the shoe-body in the manner indicated more clearly in Fig. 2 of the drawings. In this position the upper end portion of the calk is riveted, as shown at $f$, to said shoe-rib. It is evident that any desired number or arrangement of the calks may be employed.

In Figs. 3 and 4 I have shown in perspective portions of modified forms of horseshoe-bodies. The form shown in Fig. 3 consists in the employment of a shoe-body $g$, which has formed with each side thereof a downwardly-extending flange $g'$, which may be sharpened and which may serve the purpose of calks. In Fig. 4 I have shown a body $h$, having a flange on one side thereof, as indicated at $h'$.

It is obvious that a shoe constructed as herein described may be produced at a reasonable cost of manufacture and that the same may be formed light and yet exceedingly strong. The downwardly-extending rib $b$ of the shoe affords, in addition to increasing the strength of the shoe, a means of securing to the shoe the calks $d$, and in case the calks are not employed said rib $b$ will afford a firm and non-slipable support for the shoe. It is evident that where the calks are employed the same may be used until worn down to the rib $b$, after which the worn calks may be removed and new ones readily substituted.

While the form of calks herein shown is particularly adapted for use on slippery streets or roadways, it is obvious that the same would be of great utility on smooth and dry roadways or streets.

Having now fully described my invention, what I claim, and desire to secure by Letters Patent, is—

In a horseshoe, the combination with a shoe-body $a$ having a downwardly-extending rib formed therewith, of tubular calks $d$ depending from and rigidly secured to said central shoe-rib, substantially as and for the purpose specified.

JOHN G. PARSONS.

In presence of—
 C. C. SHEPHERD,
 A. L. PHELPS.